US008560400B1

(12) United States Patent
Lee

(10) Patent No.: US 8,560,400 B1
(45) Date of Patent: Oct. 15, 2013

(54) CONTEXT-BASED SERVICE DELIVERY

(75) Inventor: Wing K. Lee, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1765 days.

(21) Appl. No.: 11/617,710

(22) Filed: Dec. 28, 2006

(51) Int. Cl.
*G06Q 30/00* (2012.01)
*H04M 11/00* (2006.01)

(52) U.S. Cl.
USPC .................................... 705/26.7; 379/88.13

(58) Field of Classification Search
USPC ............... 379/114.05, 88.04–88.26; 455/405; 705/26.1–26.9
See application file for complete search history.

(56) References Cited

U.S. PATENT DOCUMENTS 5,710,887 A 1/1998 Chelliah et al.
6,259,405 B1 * 7/2001 Stewart et al. ................ 342/457
6,438,579 B1 8/2002 Hosken
6,820,204 B1 * 11/2004 Desai et al. ........................ 726/6
7,330,112 B1 * 2/2008 Emigh et al. ............. 340/539.13
7,505,779 B1 * 3/2009 David ........................... 455/518
7,636,779 B2 12/2009 Hayashi et al.
7,689,452 B2 3/2010 Lam et al.
8,010,418 B1 8/2011 Lee
8,015,119 B2 * 9/2011 Buyukkokten et al. ........ 705/319
2001/0037192 A1 * 11/2001 Shimamoto et al. .............. 704/8
2002/0076032 A1 * 6/2002 Rodriguez et al. ........ 379/266.01
2002/0194246 A1 * 12/2002 Moskowitz et al. .......... 709/102
2003/0167234 A1 * 9/2003 Bodmer et al. ................. 705/51
2004/0054726 A1 * 3/2004 Doss et al. .................... 709/205
2004/0059708 A1 * 3/2004 Dean et al. ........................ 707/1
2004/0198398 A1 10/2004 Amir et al.
2004/0203746 A1 10/2004 Knauerhase et al.
2004/0215793 A1 10/2004 Ryan et al.
2005/0021225 A1 * 1/2005 Kantarjiev et al. ........... 701/204
2005/0113107 A1 5/2005 Meunier
2005/0125240 A9 * 6/2005 Speiser et al. .................... 705/1
2005/0198131 A1 9/2005 Appelman et al.
2005/0273372 A1 * 12/2005 Bowne et al. ..................... 705/5
2006/0112079 A1 * 5/2006 Holt et al. .......................... 707/3
2006/0217991 A1 * 9/2006 Blake et al. ....................... 705/1
2007/0060099 A1 3/2007 Ramer et al.
2007/0094065 A1 * 4/2007 Wu et al. ........................... 705/9
2007/0118415 A1 * 5/2007 Chen et al. ........................ 705/8
2007/0179863 A1 * 8/2007 Stoll .............................. 705/26
2007/0214180 A1 * 9/2007 Crawford ................... 707/104.1
2007/0234216 A1 * 10/2007 Fitzpatrick et al. ........... 715/733
2007/0239552 A1 10/2007 Sundaresan
2008/0027634 A1 * 1/2008 Obradovich et al. ......... 701/208
2008/0102856 A1 5/2008 Fortescue et al.
2008/0177584 A1 * 7/2008 Altaf et al. ........................ 705/5
2009/0198624 A1 * 8/2009 Eagle, III ........................ 705/80

(Continued)

OTHER PUBLICATIONS

Office Action dated Dec. 1, 2009, U.S. Appl. No. 11/671,709, 13 pages.

(Continued)

*Primary Examiner* — Simon Sing
*Assistant Examiner* — Solomon Bezuayehu

(57) ABSTRACT

A system for delivering a context-based service to a connected device is provided. The system includes context information for a user of the connected device, a web service, and a service delivery system. The service delivery system receives context information and information from the web service. The service delivery system combines the context information and the information from the web service to create customized information for the user. The customized information is then delivered to the user's connected device.

5 Claims, 3 Drawing Sheets

(56) References Cited

U.S. PATENT DOCUMENTS

| | | | | |
|---|---|---|---|---|
| 2009/0249451 | A1 | 10/2009 | Su et al. | |
| 2009/0325551 | A1* | 12/2009 | Zellner et al. | 455/414.1 |
| 2011/0022425 | A1* | 1/2011 | Block et al. | 705/5 |

OTHER PUBLICATIONS

Lee, Wing K., "System and Method for Identifying and Managing Social Circles", U.S. Appl. No. 11/617,709, filed Dec. 28, 2006 (30 pages).

Office Action dated Jun. 4, 2010, U.S. Appl. No. 11/671,709, 13 pages.

Kautz, Henry, et al., "Referral Web: Combining Social Networks and Collaborative Filtering, An Interactive," Communications of the AMC, Mar. 1997, vol. 40, No. 3, pp. 63-65.

Advisory Action dated Feb. 23, 2011, U.S. Appl. No. 11/617,709.

Notice of Allowance dated Mar. 28, 2011, U.S. Appl. No. 11/617,709.

Aharony, Nadav, "When Worlds Collide: Impression, Identity, and Trust Management on The Border Between Online and Real-World Interactions," MAS.960: Signals, Truth and Design, Dec. 2007.

Guy, Ido, et al., "Personalized Recommendation of Social Software Items Based on Social Relations," 2009 ACM 978-1-60558-435-5/09/10, IBM Haifa Research Lab, Mt. Carmel, Haifa 31905, Israel.

Li, Nan, et al., "Multi-Layered Friendship Modeling for Location-Based Mobile Social Networks," Department of Computer Science, University of Massachusetts Lowell.

Final Office Action dated Nov. 30, 2010, U.S. Appl. No. 11/617,709.

* cited by examiner

CONTEXT-BASED SERVICE DELIVERY

CROSS-REFERENCE TO RELATED APPLICATIONS

This application is related to U.S. patent application Ser. No. 11/617,709, entitled "System and Method for Identifying and Managing Social Circles", filed on Dec. 28, 2006, by Wing K. Lee, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Any device that is capable of connecting to a network, such as a telecommunications network or the Internet, will be referred to herein as a connected device. Connected devices might include telecommunications devices such as mobile telephones and personal digital assistants, general purpose computing devices such as desktop computers and portable computers, and special purpose computing devices such as set-top boxes. Connected devices that are easily portable will be referred to herein as mobile devices.

SUMMARY OF THE INVENTION

According to one embodiment, a system for delivering a context-based service to a connected device is provided. The system includes context information for a user of the connected device, a web service, and a service delivery system. The service delivery system receives context information and information from a telecommunications provider's network intelligence and over the Internet via web services. The telecommunications provider aggregates and makes sense of the different streams of information and uses the service delivery system to create customized alerts, contextually relevant information, and even actionable choices information for the user's benefit, delivered to the user's connected device.

In another embodiment, a method is provided for delivering context-based information to a connected device. The method includes a user of the connected device specifying a first preference, and a service delivery system monitoring one or more activities of the user. The service delivery system infers a second preference of the user based on the monitored activities. The service delivery system receives information from a web service. The method includes the service delivery system combining the first preference, the second preference, and the information from the web service to create context-based information. The service delivery system delivers the context-based information to the user's connected device.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
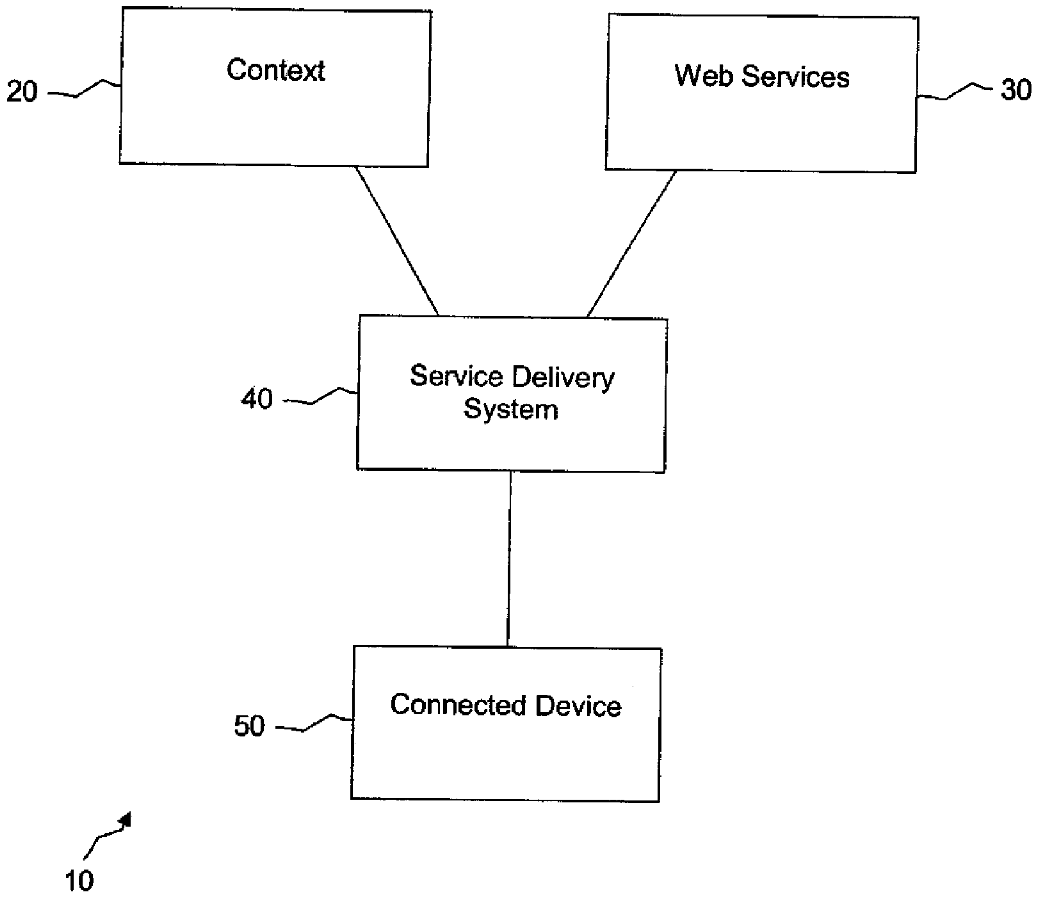
FIG. 1 is a block diagram of a system for delivering context-based services according to one embodiment of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, an Internet or other network capable connected device can proactively provide its user with services based on information assimilated from a plurality of sources. The information sources might include personal preferences specified by the user, the user's current location, the current time, the user's past telecommunications and Internet browsing activities, and the user's social circle. These information sources might be referred to collectively as the user's context. Information obtained through existing web services might be combined with context-based information to further enhance the services that can be delivered to the user via the connected device.

The personal preferences specified by the user might include typical preferences the user provides to the telecommunications provider, such as operating and display preferences, favorites, and contacts. The personal preferences might also include preferences provided to one or more third parties, such as travel-related web sites. For example, the user might have an account with a company that expedites travel arrangements via the World Wide Web. The user might provide such a company with a set of travel-related preferences such as a preferred airline, a preferred class or location for airline seating, preferences for hotels and rental cars, and other travel-related preferences. One of skill in the art will recognize other third parties to which the user might provide, preference information. The user might allow the telecommunications provider to have access to the preference information provided to one or more third parties, or otherwise allow businesses to share the user's information for the purposes disclosed herein.

It is well known in the art that the activities engaged in by a connected device user can be monitored and analyzed by the provider of telecommunications services to the device. For example, the provider might record and analyze the text messages and other communications sent to and from the user and the web sites visited by the user. From this information, the telecommunications provider might glean additional information about the user's preferences.

The preferences specified by the user and the preferences determined by the telecommunications provider through the monitoring of the user's activities might be referred to collectively as the user's profile. In some cases, the real-time information determined by the telecommunications provider might identify conflicts with the user's desires. For example, the user might have stated a preference to fly out on a specific flight, but the telecommunications provider might notice that, given the user's location and real-time traffic information obtained via web services and the time of day relative to departure time, the user would not be able to make that flight. The telecommunications provider might proactively contact the user via appropriate electronic means to offer the user alternative flights based on information obtained via web services. The telecommunications provider might also make appropriate travel arrangements by brokering the user's identity and profile information to travel agencies based on the user's input.

The user's social circle includes, but is not limited to, the set of contacts with whom the user communicates via the connected device. The social circle might originally be specified by the user and might later be automatically modified by the telecommunications provider based on the user's actual usage patterns. Alternatively, the social circle might be entirely inferred by the telecommunications provider or might first be inferred by the telecommunications provider and then modified by the user.

The usage patterns might be based on the persons whom the user calls, the persons to whom the user sends Short Message Service (SMS) messages, the persons to whom the user sends pager messages, the persons to whom the user sends instant messages, and the persons with whom the user communicates via two-way radio. The social circle might include references to the degrees of separation of the user from the contacts. For example, contacts with whom the user regularly communicates might be considered to have one degree of separation from the user. Persons with whom those contacts communicate but who do not communicate with the user might be considered to have two degrees of separation from the user, and so on. Further information related to social circles can be found in U.S. patent application Ser. No. 11/617,709, entitled "System and Method for Identifying and Managing Social Circles", filed on Dec. 28, 2006, by Wing K. Lee, which is incorporated herein by reference for all purposes.

The user's current location might be determined by a global positioning system (GPS) or other positioning system installed in the connected device. Time information might also be obtained from the connected device or might be obtained from the telecommunications providers clocks.

The user's social circle and the user's current location might be referred to collectively as the user's presence. The profile, the presence, and the current time might be referred to collectively as the user's context. The context might be constantly updated by changes in time or the user's location. The context might also change based on the user's telecommunications and web browsing activities or based on modifications deliberately made by the user, such as changing a preference.

It is well known in the art that services known as web services are available via the World Wide Web. For example, travel information, police reports, weather reports, traffic reports, and similar information might be available as web services. Other types of information that might be available through web services, such as stock quotes and the status of auction bids, will be familiar to one of skill in the art.

In an embodiment, a telecommunications provider can gather context information about a particular customer and information obtained through one or more web services. The two information sources can then be automatically combined to provide the customer with highly customized information that the telecommunications provider can send in an automated manner to the customers connected device when requested by the customer. Automated systems managed by the telecommunications provider might also proactively send customized information to the customer without a request from the customer when an analysis of the information indicates that the information might be helpful to the customer. The customer might use the connected device to respond to the information received in this manner and the automated systems managed by the telecommunications provider might take further actions based on the response.

FIG. 1 illustrates an embodiment of a system 10 that can deliver context-based services. A context 20 for a telecommunications customer might include the customer's profile, the customer's presence, and the current time, as described above. One or more web services 30 might also be available. Information related to the context 20 and the web services 30 can be provided to an automated, context-based service delivery system 40 that may be managed, controlled, or otherwise overseen by a telecommunications provider, for example. The service delivery system 40 can assimilate and analyze the context information and the web services information to create customized information that can reactively or proactively be provided to a connected device 50 used by the customer. The service delivery system 40 might also be able to offer the customer options for future actions based on the customized information that has been generated. When the customer selects one of the options, the service delivery system 40 might be able to take appropriate actions based on the customer's choices.

To illustrate some of the services the context-based service delivery system 40 might provide, an example will be given of a user of the connected device 50 driving to an airport to take a flight. Since the user in this example is traveling, the connected device 50 will be assumed to be a mobile device and will be referred to in this example as the mobile device 50. However, it should be understood that, in other scenarios, the connected device 50 could be a non-portable device such as a general purpose computer, a special purpose computing device (such as a set-top box), or some other type of connected device.

Based on information that the user has provided, the service delivery system 40 might be aware of the user's flight number, flight time, and other information related to the flight. The user might have provided the flight information directly to the telecommunications provider or to a travel agency or a travel-related web site to which the telecommunications provider has access via federating the user's identity or the service delivery system 40 might gain access to this information in another manner. A positioning system, such as a GPS, in the user's mobile device 50 may be able to provide the service delivery system 40 with the user's current location. The service delivery system 40 might also be aware of the current time.

In addition, the service delivery system 40 might have access to one or more web services 30 that are relevant to the user's situation. For example, the service delivery system 40 might have access to one or more web services 30 that could provide traffic information related to the route that the user is taking to the airport. The service delivery system 40 might also have access to one or more web services 30 that provide police reports, weather reports, and other reports that could have an impact on the user's drive to the airport. In addition, the service delivery system 40 might have access to one or more travel-related web services 30 that could provide information about the flight the user intends to take, other flights that might be available to the user, hotel information, rental car information, and other information that might be relevant to the user's trip.

Using the user's current location, the location of the airport, the current time, the time of the user's flight, the speed limit on the road on which the user is driving, and other pertinent information, the service delivery system 40 might automatically calculate whether the user will arrive at the airport in time for the flight. The service delivery system 40 might also take real-time traffic information and road conditions into account when determining the time needed for the user to arrive at the airport. For example, by consulting a traffic-related web service 30, the service delivery system 40 might determine that the user is approaching an area of heavy traffic or severe weather conditions that will prevent the user from reaching the airport in time even though the user would reach the airport in time if the traffic were flowing freely.

When the service delivery system 40 determines that the user is unlikely to arrive at the airport in time for the flight, the service delivery system 40 can send a message to the user's mobile device 50 informing the user of that fact and offering the user one or more options. For example, in the case where heavy traffic on the user's current route will prevent the user from reaching the airport in time, the service delivery system 40 might send a message suggesting an alternate route that might allow the user to reach the airport in a timely manner.

If the service delivery system 40 determines that the user will not reach the airport in time for the flight regardless of the route, the service delivery system 40 might provide the user with suggestions for alternative flights. That is, the service delivery system 40 might take into account flight information retrieved from a travel-related web service 30, such as the availability of later flights to the user's destination or nearby destinations. The service delivery system 40 might also take into account the user's preferences for airlines, seating class and location, and other flight-related preferences explicitly stated by the user or gleaned from the user's past activities. Combining these sources of information, the service delivery system 40 might automatically determine one or more flights that the user might wish to take instead of the flight that is likely to be missed. The service delivery system 40 might then automatically send a message to the user's mobile device 50 listing the options for alternative flights.

The user might then use the mobile device 50 to select one of the options presented by the service delivery system 40. Upon the selection of an option by the user, the service delivery system 40 might automatically communicate with the travel-related web service 30 to cancel the user's reservation on the previously scheduled flight and make a reservation for the user on the selected flight. If rental car reservations, hotel reservations, or other travel-related arrangements also needed to be modified due to the change in the flight, the service delivery system 40 might automatically communicate with the travel-related web service 30 to do so. The service delivery system 40 might then automatically send a confirmation of the change in travel plans to the user's mobile device 50.

Continuing this example, the service delivery system 40 might also automatically take the user's social circle into account when considering options to present to the user. For example, the service delivery system 40 might be aware of the current location and travel plans of one or more members of the user's social circle. It might happen that a member of the user's social circle is scheduled to be on one of the flights that the service delivery system 40 is listing as an alternative flight for the user, or a member of the user's social circle might be in the city to which the user is flying, or some other coincidence might occur that could cause the user and the member of the social circle to be in the same location at the same time. The awareness by the service delivery system 40 of the user's travel plans and the travel plans of the member of the social circle could allow the service delivery system 40 to notice such a coincidence and make the user aware of the coincidence. The user might then make travel arrangements that take the presence of the member of the social circle into account.

In a related example, the service delivery system 40 might provide the user with suggestions on items of interest in the destination city. Members of the user's social circle who live in or have visited the city might have previously provided the service delivery system 40 with recommendations for hotels, restaurants, activities, and other items of interest in the city. Alternatively, the service delivery system 40 might automatically infer such recommendations based on its monitoring of the activities of the members of the social circle while in the city. For example, the service delivery system 40 might use GPS-derived location information to determine that a member of the user's social circle spends a great deal of time at a particular location. Using information obtained from one or more web services 30, the service delivery system 40 might be able to determine that that location is a restaurant and might therefore recommend that restaurant to the user.

Since the members of the user's social circle are likely to have tastes that are similar to those of the user, the user might be inclined to place more trust in such recommendations than in recommendations from other sources. The service delivery system 40 might automatically and proactively send such recommendations to the user's mobile device 50 upon learning the user's travel plans or upon the user's arrival at the destination. Alternatively, the user might use the mobile device 50 to request such recommendations from the service delivery system 40.

The above examples are merely intended to illustrate several use cases for the service delivery system 40 and should not be considered the only situations in which the service delivery system 40 could be employed. One of skill in the art will recognize other ways in which the service delivery system 40 might use context information 20 and one or more web services 30 to provide context-based services to a connected device user.

Figure 2:
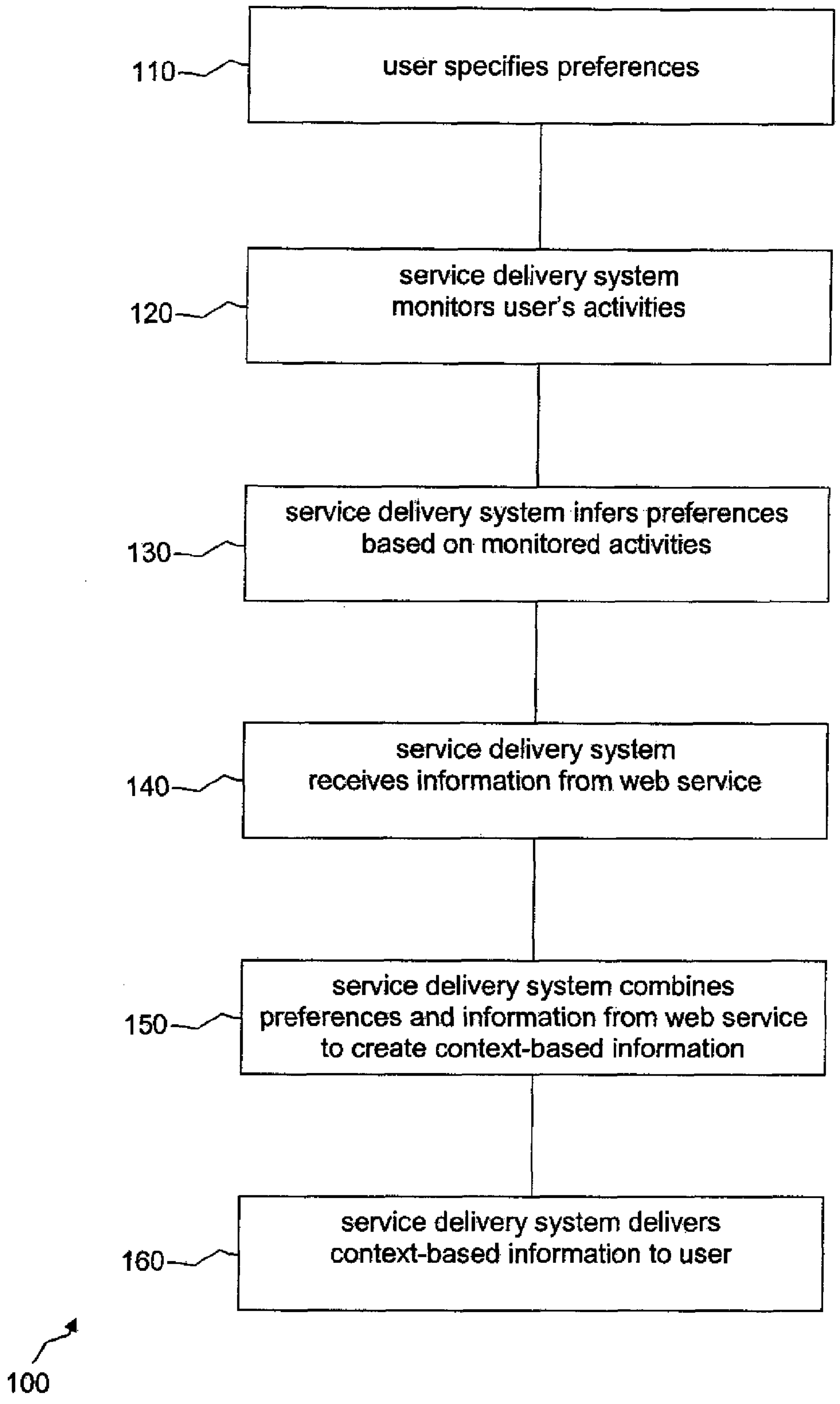
FIG. 2 is a flow chart of a method for delivering context-based information according to one embodiment of the present disclosure.

FIG. 2 illustrates a method 100 for delivering context-based information to a connected device. In block 110, a user of the connected device specifies one or more preferences. In block 120, a service delivery system managed by a telecommunications provider monitors the activities of the user. In block 130, the service delivery system infers one or more of the user's preferences based on the monitored activities. In block 140, the service delivery system receives information from one or more web services. In block 150, the service delivery system combines the preferences and the information from the web services to create the context-based information. In block 160, the service delivery system delivers the context-based information to the user. The service delivery system might also take actions based on the context-based information or on the user's responses to the context-based information.

Figure 3:
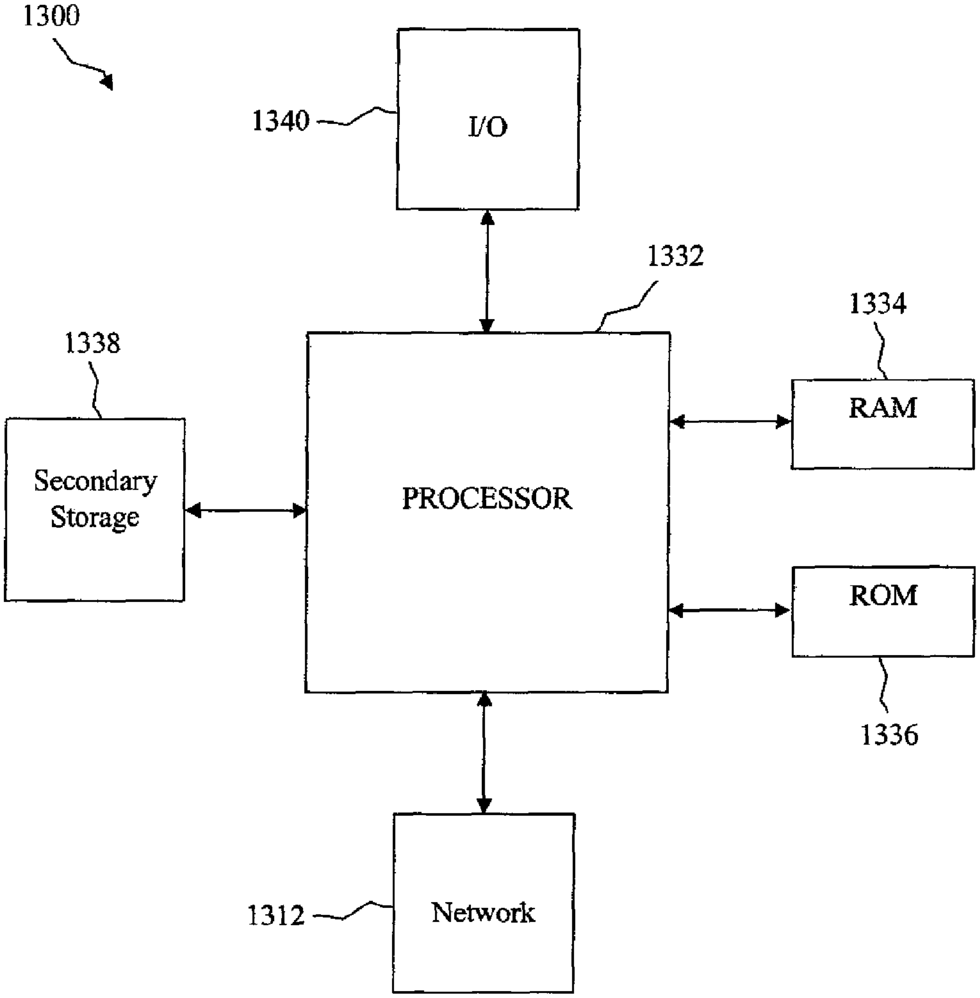
FIG. 3 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for delivering context-based information to a connected device, comprising:

receiving context information for a user of a connected device by a service delivery system, wherein the context information for the user includes preferences of the user, information on individuals in the user's social circle, and a location of the user, wherein the social circle comprises a set of contacts inferred by a telecommunications provider based on whom the user communicates via the connected device;

receiving current plans of the user relating to a destination by the service delivery system;

combining the context information for the user and the current plans of the user to identify a recommendation from one or more recommendations of a member of the user's social circle, wherein the recommendation is for an item of interest related to the current plans of the user, wherein the identified recommendation is inferred by the service delivery system based on monitoring activities of at least one contact in the user's social circle in the destination, and wherein the identified recommendation is inferred by the service delivery system based on a location of the monitored activities in the destination in combination with information obtained from one or more web services related to the location of the monitored activities in the destination; and proactively sending the recommendation to the user's connected device by the service delivery system.

2. The method of claim 1, wherein the current plans of the user are travel-related plans.

3. The method of claim 2, wherein the recommendation is for an item of interest in the destination, and wherein the destination is a destination city.

4. The method of claim 3, wherein the service delivery system proactively sends the recommendation to the user's connected device upon learning of the user's travel plans.

5. The method of claim 3, wherein the service delivery system proactively sends the recommendation to the user's connected device upon the user's arrival at the destination city.

* * * * *